United States Patent
Yuan et al.

(10) Patent No.: US 11,831,395 B2
(45) Date of Patent: Nov. 28, 2023

(54) SYSTEMS AND METHODS FOR PROVIDING CONFIGURABLE REFERENCE FREQUENCIES

(71) Applicant: Hughes Network Systems, LLC, Germantown, MD (US)

(72) Inventors: Yong Kang Yuan, Clarksburg, MD (US); Kevin Wong Tat, Potomac, MD (US); Emanuel Harrington, Bowie, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 103 days.

(21) Appl. No.: 17/561,455

(22) Filed: Dec. 23, 2021

(65) Prior Publication Data
US 2023/0208509 A1 Jun. 29, 2023

(51) Int. Cl.
*H04B 7/185* (2006.01)
*H04W 84/06* (2009.01)

(52) U.S. Cl.
CPC ..... *H04B 7/18517* (2013.01); *H04B 7/18513* (2013.01); *H04W 84/06* (2013.01)

(58) Field of Classification Search
CPC .......... H04B 7/185–195; H04W 84/06
See application file for complete search history.

(56) References Cited

U.S. PATENT DOCUMENTS

| | | | |
|---|---|---|---|
| 2003/0163821 A1 | 8/2003 | Knutson et al. | |
| 2008/0198791 A1 | 8/2008 | Lloyd et al. | |
| 2010/0022191 A1 | 1/2010 | Sigmund | |
| 2010/0274796 A1* | 10/2010 | Beauregard | H04L 12/1822 379/202.01 |
| 2011/0151777 A1* | 6/2011 | Kim | H04B 7/18528 455/13.4 |
| 2013/0009809 A1* | 1/2013 | Bert | H04B 7/2041 342/354 |
| 2016/0095116 A1 | 3/2016 | Jackson et al. | |
| 2016/0191148 A1* | 6/2016 | Harrington | H04B 7/18595 370/316 |
| 2016/0218797 A1* | 7/2016 | Harrington | H04W 52/248 |
| 2016/0352438 A1 | 12/2016 | Robinson et al. | |

(Continued)

FOREIGN PATENT DOCUMENTS

EP 0761062 A1 3/1997

OTHER PUBLICATIONS

"The International Search Report and Written Opinion on PCT Application No. PCT/US2021/065142", dated Sep. 16, 2022, 15 pages.

*Primary Examiner* — Raymond S Dean
(74) *Attorney, Agent, or Firm* — MANNAVA & KANG, PC; George Y. Wang

(57) ABSTRACT

A network device for providing configurable reference frequencies in a satellite communication system is disclosed. The network device may be any of a satellite modem, satellite transceiver, or satellite router. The network device may receive information pertaining to a type of an Outdoor Unit (ODU), determine the type of ODU based on the received information, and provide a plurality of configurable reference frequencies based on the type of the Outdoor Unit (ODU) such that the plurality of configurable reference frequencies may be used with different combinations of low noise block converters (LNBs) and block-up converters (BUCs).

20 Claims, 8 Drawing Sheets

(56) References Cited

U.S. PATENT DOCUMENTS

2016/0372838 A1\* 12/2016 Jackson ................. H01Q 1/48
2017/0264020 A1\* 9/2017 Jackson ............... H01Q 19/19
2018/0097285 A1\* 4/2018 Tang .................... H04B 7/185

\* cited by examiner

SYSTEMS AND METHODS FOR PROVIDING CONFIGURABLE REFERENCE FREQUENCIES

TECHNICAL FIELD

This patent application is directed to satellite communication systems and, more specifically, to devices, systems, and methods for providing configurable reference frequencies to be used with different combinations of low noise block converters (LNBs) and block-up converters (BUCs) in a satellite communication network.

BACKGROUND

Advances in telecommunications technologies are increasing the availability of voice, data, entertainment, infotainment services to consumers. These technological developments are enabling consumers to transmit and receive increasingly larger amounts of multimedia digital content, such as texts, streaming audio or video, social media or web content, digital entertainment, interactive gaming, or other digital content.

Satellite communication systems may be used to provision voice and data services to customers (end users). In order to serve more customers and provide higher and affordable quality service to multiple customers at remote locations, very-small-aperture terminals (VSATs) may be deployed in satellite communication systems. However, managing a higher volume of satellite communication components to ensure quality service is becoming more and more challenging.

BRIEF DESCRIPTION OF DRAWINGS

Features of the systems and methods are illustrated by way of example and not limited in the following Figure(s), in which like numerals indicate like elements, in which.

DETAILED DESCRIPTION

Figure 1:
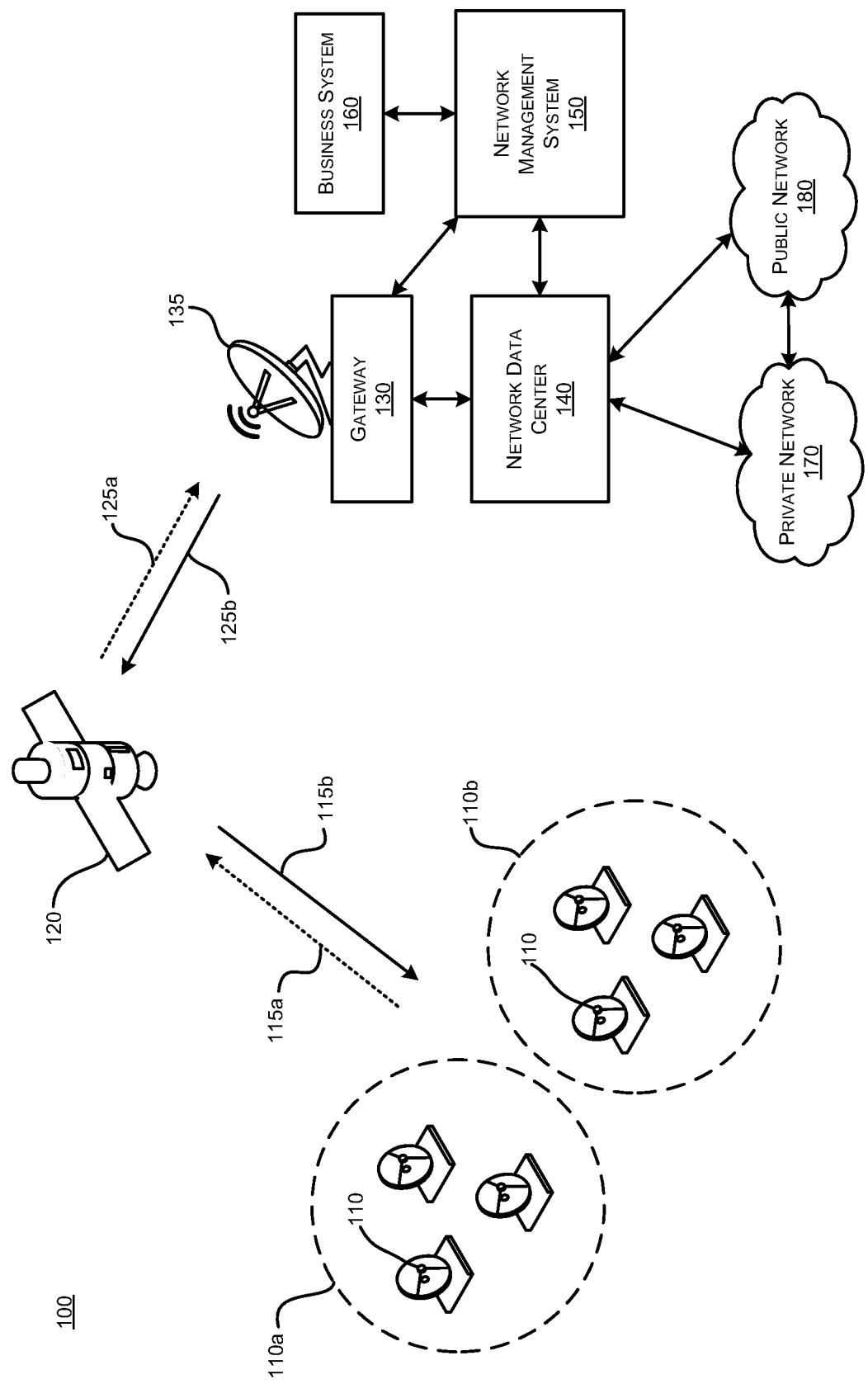
FIG. 1 illustrates a system for establishing satellite communication between terminals or VSATs and a satellite, according to an example.

For simplicity and illustrative purposes, the disclosed systems and methods is described by referring mainly to examples and embodiments thereof. In the following description, numerous specific details are set forth in order to provide a thorough understanding of the disclosed systems and methods. It will be readily apparent, however, that the disclosed systems and methods may be practiced without limitation to these specific details. In other instances, some methods and structures readily understood by one of ordinary skill in the art have not been described in detail so as not to unnecessarily obscure the disclosed systems and methods. As used herein, the terms "a" and "an" are intended to denote at least one of a particular element, the term "includes" means includes but not limited to, the term "including" means including but not limited to, and the term "based on" means based at least in part on.

As described above, there are many challenges to ensure quality service for satellite communications systems that employ VSATs. A VSAT is a two-way satellite ground station that may be in form of a satellite dish including an outdoor unit (ODU), and an indoor unit (IDU). The ODU may include a reflector, a feed horn that both transmits and receives signals back from the reflector, a block-up converter (BUC) that may be used for transmission, and a low noise block converter (LNB) that may be used to receive signals. VSATs may require a reference frequency to operate the BUCs and LNBs, which may be provided by the IDU of the corresponding VSATs, The IDU may include a network device that may be any of a satellite modem, satellite transceiver, or a satellite router, which may operate the VSAT in various bands. Depending on the design and function of the BUCs and LNBs, any one of the external reference frequencies ranging from 10 MHz, 50 MHz, or 100 MHz, and the likes, may be provided to the BUCs/LNBs.

Network devices are typically designed to provide only one fixed reference frequency for a single set of BUC/LNB. In order to operate a different set of BUC/LNB requiring a different reference frequency, another network device/satellite modem of a different variant and design may be required. This limits the ability for customers to switch between different BUCs/LNBs without changing the satellite modem. Although multiple variants or designs of network device/satellite modem may be deployed in a single network to provide a wide range of reference frequencies for the different sets of BUCs/LNBs as per the requirement, however, this may cause a corresponding increase in the number of backend components required in the communication network or VSATs. Further, each network device may require a different clock frequency or clock. The increased number of network devices/satellite modems may tend to further exacerbate the problems as they may increase the complexities in the operation and usage of the network and corresponding equipment. Managing a higher volume of backend components, however, may be more challenging, especially when it comes to tending to potentially more malfunctions or defects in any of these components of the VSAT or network devices.

A single IDU or network device, for example, may provide only a fixed reference frequency for a single set of BUC/LNB. In order to operate a different set of BUC/LNB requiring a different reference frequency, another network device of a different variant and design may be required. This limits the ability for customers to switch between different BUCs/LNBs without changing the network device, as the same network device may not be compatible with other sets of BUCs/LNBs requiring different reference frequencies and also functionally incapable of generating a variable set of reference frequencies as per the requirement of other sets of BUCs/LNBs.

To address these issues, some satellite communication systems may employ multiple variants or designs of the network device in a single system to provide different sets of BUC/LNB requiring different reference frequencies in order to achieve a wider range and higher quality and more reliable satellite communication services to a variety of customers. However, in order to support the larger number of a different set of BUC/LNB requiring a different reference frequency, the VSATs and network device may require an increase in the number of components, such as oscillators, switches, amplifiers, divider circuits, splitters, etc. This increase in components may generally correspond with a rise in system complexity and may therefore lead to a greater probability of malfunction or defects. The added complexities may therefore give rise to more challenges in managing or troubleshooting all the issues associated with the various components of satellite communication systems.

However, employing a dedicated network device/satellite modem for generating different sets of reference frequencies may be highly expensive, and therefore cost-prohibitive for many service providers. For instance, the cost for using VSATs becomes increasingly more expensive as the number of the network device and associated components grows. Furthermore, systems requiring multiple sets of a dedicated network device may require customers to change the connection of a required network device to a given BUCs/LNBs to operate the VSAT in a dedicated band, which in turn may require extensive manual control to be exercised at all the different services and service paths available in the satellite communication system. Consequently, satellite system operators may use different network devices to generate a required reference frequency only after proper inspection of the required reference frequencies for the BUCs/LNBs and as per band requirements of the VSAT. Additionally, deploying different types and variants of network devices may be structurally impractical for some network configurations in terms of size and complexity of the overall system as the overall number of components and space required may correspondingly increase with the increase in the number of network devices.

Furthermore, the increased number of network devices and associated backend components may further generate a lot of heat, thereby requiring additional or enhanced cooling systems to keep the overall system in a controlled temperature environment. Network device and their associated components typically employ semiconductor devices that work optimally under a given temperature range, else the semiconductor devices may start working inefficiently and may also fail if the temperature goes beyond a safe range. This inefficient working or failure of the semiconductor devices may affect the working of the network devices, leading to inefficient working or overall failure of the network device as well as the satellite communication systems. Additionally, the cooling systems/requirement may further make the overall system complex, expensive, and bulky, requiring frequent maintenance and servicing.

Accordingly, customizable and flexible devices, systems and methods for providing configurable reference frequencies may be needed. Satellite communication systems may benefit from solutions or approaches that are capable of scaling with less cost, as well as those that are more efficient and proactive in providing configurable reference frequencies.

The devices, systems, and methods described herein, however, may opportunistically use a single customizable and flexible network device, rather than multiple dedicated network devices, to provide different sets of reference frequencies for various applications. For example, to operate the VSAT in a required band, the IDU may provide a plurality of configurable frequencies including radio transmitter (TX) and radio receiver (RX) reference frequencies to be used with different combinations of BUCs and LNBs.

The devices, systems, and methods described herein may utilize a single low noise oscillator and one or more digital to analog converters (DACs) to generate the plurality of configurable reference frequencies, which may be interoperable with Commercially Off-the-Shelf (COTS) BUCs and LNBs that require different reference frequencies. In addition, the devices, systems, and methods described herein may provide a more simplistic and efficient approach and design all that while maintaining lower expense and operating cost. In the examples described herein, a design, process, or technique may be employed to generate configurable reference frequencies based on the type of ODU, where the low noise oscillator and one or more DACs may be employed to generate the plurality of configurable reference frequencies as per the network requirement, rather than using a large number of backend components as used in existing/conventional techniques.

In this manner, the devices, systems and methods for providing a plurality of configurable reference frequencies, as described herein may provide solutions and designs that are more proactive, simple, cost-efficient, scalable, and amenable to broader satellite communication. These and other benefits and advantages may be apparent in the examples outlined below.

As described herein, the term "network device" may refer to a device or system that may be implemented in VSAT to generate reference frequencies based on the type of ODU of the VSATs, where the generated reference frequencies may be used with the LNBs and BUCs associated with the IDU of the corresponding VSAT. For example, "network device" may be used to individually or collectively refer to devices including but not limited to a satellite modem, a satellite transceiver, or a satellite router.

FIG. 1 illustrates a system 100 for establishing satellite communication, according to an example. In some examples, the system 100 may depict a satellite communication system capable of providing at least voice and/or data services. In some examples, the satellite communication may be a high throughput satellite (HTS) system. The system 100 may include any number of terminals 110, a satellite 120, a gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be customer terminals, such as very small aperture terminals (VSATs). It should be appreciated that VSATs may be terminals that are mounted on a structure, habitat, or other object or location. Depending on the application, terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

As shown in FIG. 1, there may be a plurality of groups of terminals 110 (e.g., customer VSATs). For example, there may be a first group 110A of terminals 110 and a second group 110B of terminals 110. In some examples, the first group 110A may be "pre-qualified" terminals. The second group 110B may be "disqualified" terminals. The process and mechanism in providing configurable reference frequencies by the terminals 110 will be described in greater detail below. That said, it should be noted that categorizing the terminals 110 into at least a first group 110A and a second group 110B may be an important aspect of monitoring system health. In some examples, the devices, systems, and methods described herein may recognize that there are terminals 110 (e.g., VSATs including network devices such as satellite modem, a satellite transceiver, or satellite router, and the likes) that are deployed and not actively in use by customers. By identifying and leveraging these particular terminals 110, the devices, systems, and methods described herein may provide configurable reference frequencies to be used with different combinations of low noise block converters (LNBs) and block-up converters (BUCs) associated with the terminals 110 in a satellite communication network, as described below. These and other benefits will be apparent in the examples presented below.

The satellite 120 may be an object intentionally placed into orbit. In some examples, the satellite 120 may be an artificial satellite that is configured to transmit and receive data signals. For example, the satellite 120 may form one or more beams and provide connectivity between at least the terminals 110 and the gateway 130. More specifically, the satellite 120 may communicate data signals using these beams with the terminals 110 via a terminal return channel 115a and a terminal forward channel 115b, and with the gateway 130 via a gateway return channel 125a and a gateway forward channel 125b. It should be appreciated that the satellite 120 may form any number of beams to communicate data signals with any number of components, even beyond the terminals 110 or the gateway 130 as shown.

In some examples, the satellite 120 may be a communication satellite, such as a high-throughput satellite, which may include any satellite that is capable of providing at least twice (e.g., 20+ times, 100+ times, etc.) the total amount of throughput as a classic fixed-satellite service (FSS) satellite. In some examples, the satellite 120 may include, but not limited to, a transponder satellite, a regenerative satellite, and/or other similar satellite that may generate one or more spot beams. Furthermore, in some examples, the satellite 120 may operate in geosynchronous, mid-earth, low-earth, elliptical, or some other orbital configuration.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public internet 180 and/or private network 170 across the satellite communication channels 115a, 115b, 125a, or 125b to any terminal 110, which would then provide data communications or route traffic to any customer premise equipment (CPE) (not shown) associated with the terminal 110. Although depicted as a single element, the gateway 130 may include a single gateway, multiple gateways residing locally or remotely, in full or in part, relative to the other system components. As described in more detail below, the gateway 130, the network data center 140, and/or the network management system (NMS) 150 may provide operations associated with system health monitoring and fault detection.

The network data center 140 may be communicatively coupled to the gateway 130, as well as other system components, such as the network management system (NMS) 150, private network 170, and/or public network 180. In some examples, the network data center 140 may be a satellite network data center that is configured to perform protocol processing and bandwidth allocation for gateway traffic and/or VSAT communications in the served beams. Although depicted in FIG. 1 as a separate and distinct element, the network data center 140, in some examples, may be collocated and/or integrated, fully or partially, with the gateway 130, or may be positioned at some other location. Furthermore, although shown as a single element, the network data center 140, in some examples, may include a plurality of network data centers that are local or remote, in full or in part, relative to the other system components.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit.

The network management system (NMS) 150 may also include any number of reporting systems. As will be discussed in greater detail below, each of these multiple reporting systems may be configured to receive different information (e.g., reports) from the terminals 110. External reporting systems may also be configured to receive information (e.g., reports) from the terminals 110 by establishing a communication link with the network management system (NMS) 150.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to monitor the status of its own terminals 110. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180.

The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate the transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, system component 200, and their components, as shown in FIG. 1.

Figure 2:
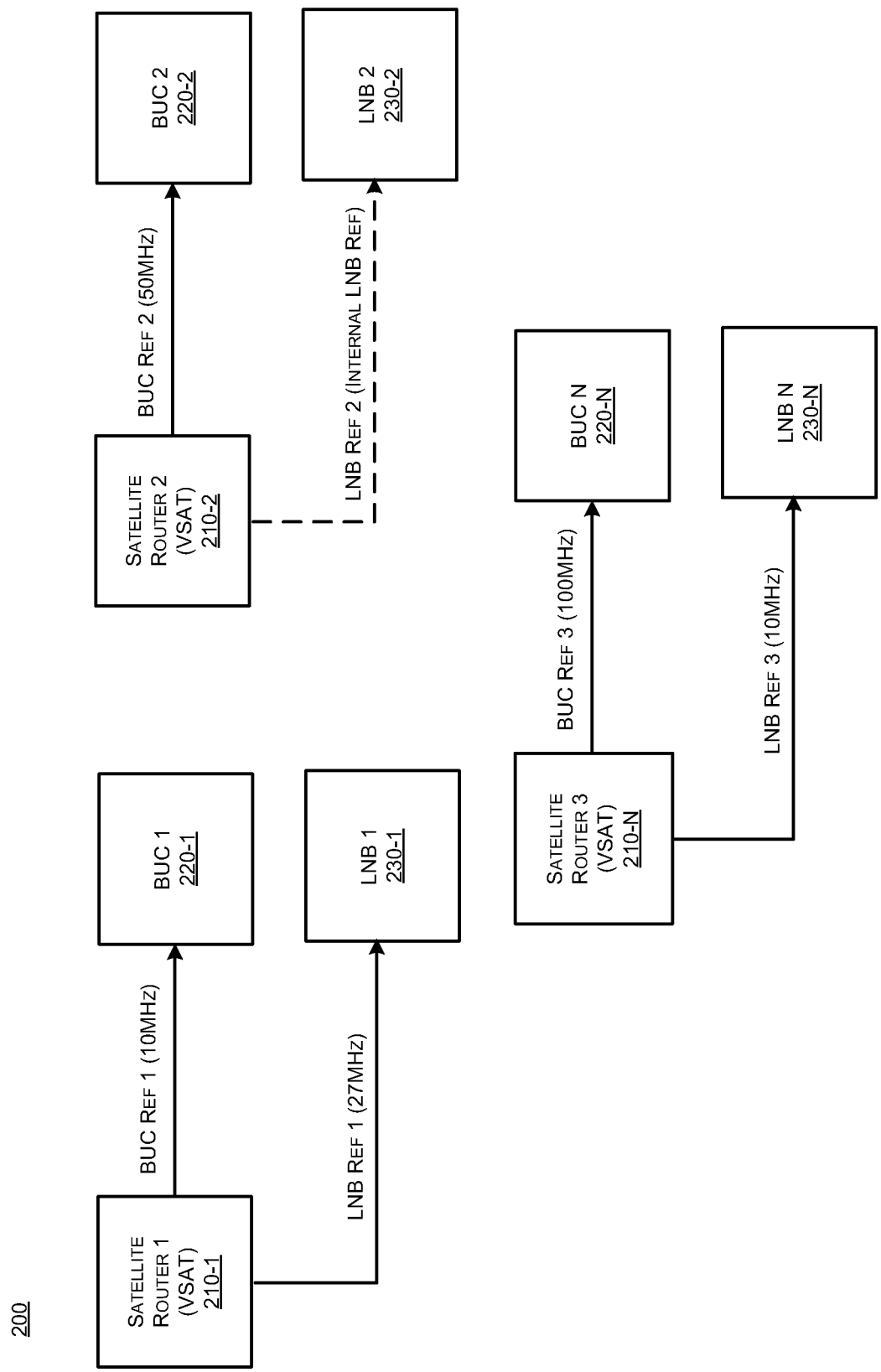
FIG. 2 illustrates a system involving multiple VSATs or terminals to provide different reference frequencies to be used with different combinations of LNBs and BUCs.

FIG. 2 illustrates a system 200 requiring multiple VSATs or terminals 210-1 to 210-N, each capable of providing one fixed reference frequency in order to provide/generate different reference frequencies to be used with different combinations of block-up converters (BUCs) 220-1 to 220-N (collectively designated as 220) and low noise block converters (LNBs) 230-1 to 230-N (collectively designated as 230) associated with the terminals or VSATs 210 in the network. As depicted, in a conventional implementation, the conventional system 200 may include one or more network devices or satellite routers or satellite modems 202-1 to 202-N (collectively referred to as network devices or routers or modems 210, herein). Each router 210 may be interfaced with different sets of BUCs and LNBs 220, 230. For example, as shown in FIG. 2, a first router 210-1 may be interfaced with the first set of BUCs 220-1 and LNBs 230-1, a second router 210-2 may be interfaced with the second set of BUCs 220-2 and LNBs 230-2, and an Nth router 210-N may be interfaced with an Nth set of BUCs 220-N and LNBs 230-N. Each of the routers 210 may be designed and selected to provide at least one set of reference frequencies for the corresponding set of BUCs and LNBs 220, 230. For example, as shown in FIG. 2, the first router 210-1 may provide 10 MHz of reference frequency to the first BUC 220-1, and 27 MHz of reference frequency to the first LNB 230-1. Further, the Nth router 210-N may provide 100 MHz of reference frequency to the Nth BUC 220-N, and 10 MHz of reference frequency to the Nth LNB 230-N, where N represents any integer greater than one.

Figure 3:
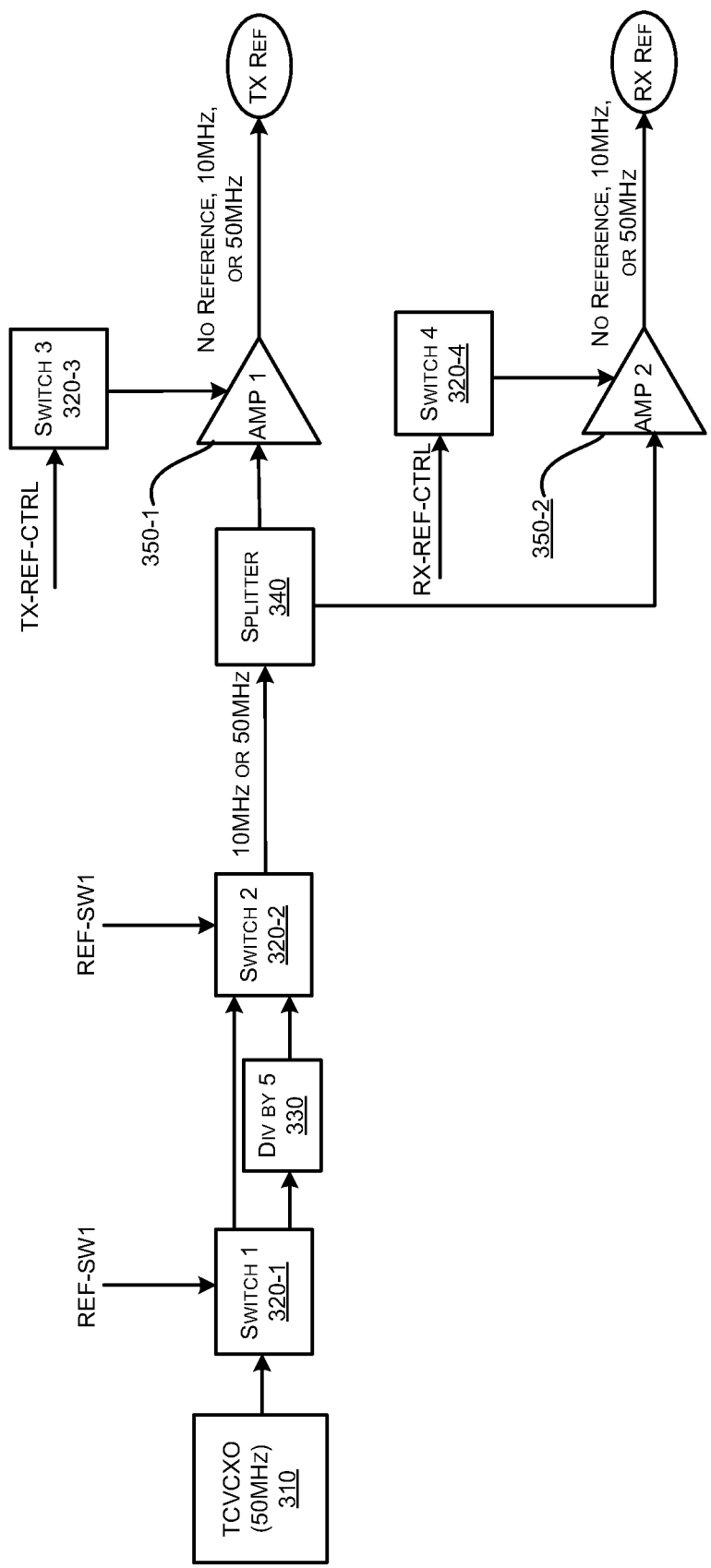
FIG. 3 illustrates a block diagram of a typical network device used for generating fixed reference frequencies.

FIG. 3 illustrates a block diagram of a conventional/typical network device/modem/router 300 for providing/generating fixed reference frequencies to a single set of BUC and LNB. In an example, a typical network device 300 may include an oscillator 310 operable to generate an output reference frequency of a first value. The oscillator 310 may be connected to a divider circuit 330 that processes the output reference frequency of the oscillator 310 to generate a reference frequency of a second value. The second value or the reference frequency generated by the divider circuit 330 may be $1/N^{th}$ times the first value or the reference frequency generated by the oscillator 310 depending on the type of the divider circuit 330, where N represents any integer greater than one. For example, the oscillator 310 may generate 50 MHz as output reference frequency, and the divider circuit 330 may be a $1/5^{th}$ divider that may receive and process the reference frequency of 50 MHz from the oscillator 330 to generate the reference frequency of 10 MHz. The divider circuit 330 may be connected to the output of the oscillator 310 through a first switch 320-1. Further, the outputs of the divider circuit 330 and the first switch 320-1 may be connected to a radio frequency (RF) splitter 340 through a second switch 320-2 such that based on the actuation of the first and second switches 320-1, 320-2, two different sets of reference frequencies may be generated and provided to the splitter 340. The splitter 340 may include two outputs, which may be connected to a first amplifier 350-1 and a second amplifier 350-2, respectively. The splitter 340 may split and transfer the two reference frequencies to the first and second amplifier 350-1, 350-2. The network device 300 may further include a third switch 320-3 connected to the first amplifier 350-1 and a fourth switch 320-4 connected to the second amplifier 350-2. The third switch 320-3, based on a transmitter (Tx) reference control signal, may actuate the first amplifier 350-1 to process one of the two output signals of the splitter 340 to generate a given value of Tx reference signals. Further, the fourth switch, based on a receiver (Rx) reference control signal, may actuate the second amplifier 350-2 to process the other output signal of the splitter 340 to either generate a given value of Rx reference signals or no Rx reference signals. In an example, as shown in FIG. 3, the Rx reference control signal may disable the second amplifier 350-2 if the 50 MHz path is directly chosen for the first and second switches 320-1, 320-2 of the network device 300.

Accordingly, the typical network device 200 or modem 300 of FIG. 3 may provide only one fixed reference frequency for a single set of BUC/LNB. This limits the ability of typical system 200 or network device 300 to switch between different BUCs/LNBs without changing the satellite modem. However, in order to operate multiple sets of BUC/LNB requiring different reference frequencies as shown in FIG. 2, multiple network devices 300 (as shown in FIG. 3) of different variants and designs may be required. Although multiple variants or designs of network device/modem/router may be deployed in a single network to provide a wide range of reference frequencies for the different sets of BUCs/LNBs as per the requirement, however, this may cause a corresponding increase in the number of backend components such as switches, amplifiers, splitters, and divider circuits required in the system. Further, each network device may require a different oscillator for generating different clock frequencies. The increased number of network devices and associated backend components may tend to further exacerbate the problems as they may increase the complexities in the operation and usage of a typical system and network devices. Further, managing a higher volume of backend components, however, may be more challenging, especially when it comes to tending to potentially more malfunctions or defects in any of these components of the VSAT or network devices.

The devices, systems, and methods described herein may overcome the above-mentioned drawbacks, limitations, and drawbacks associated with a typical system and network device, and may provide a single flexible and customizable network device for providing configurable reference frequencies to be used with different combinations of BUCs and LNBs associated with the terminals or VSATs 110 in the network.

Figure 4:
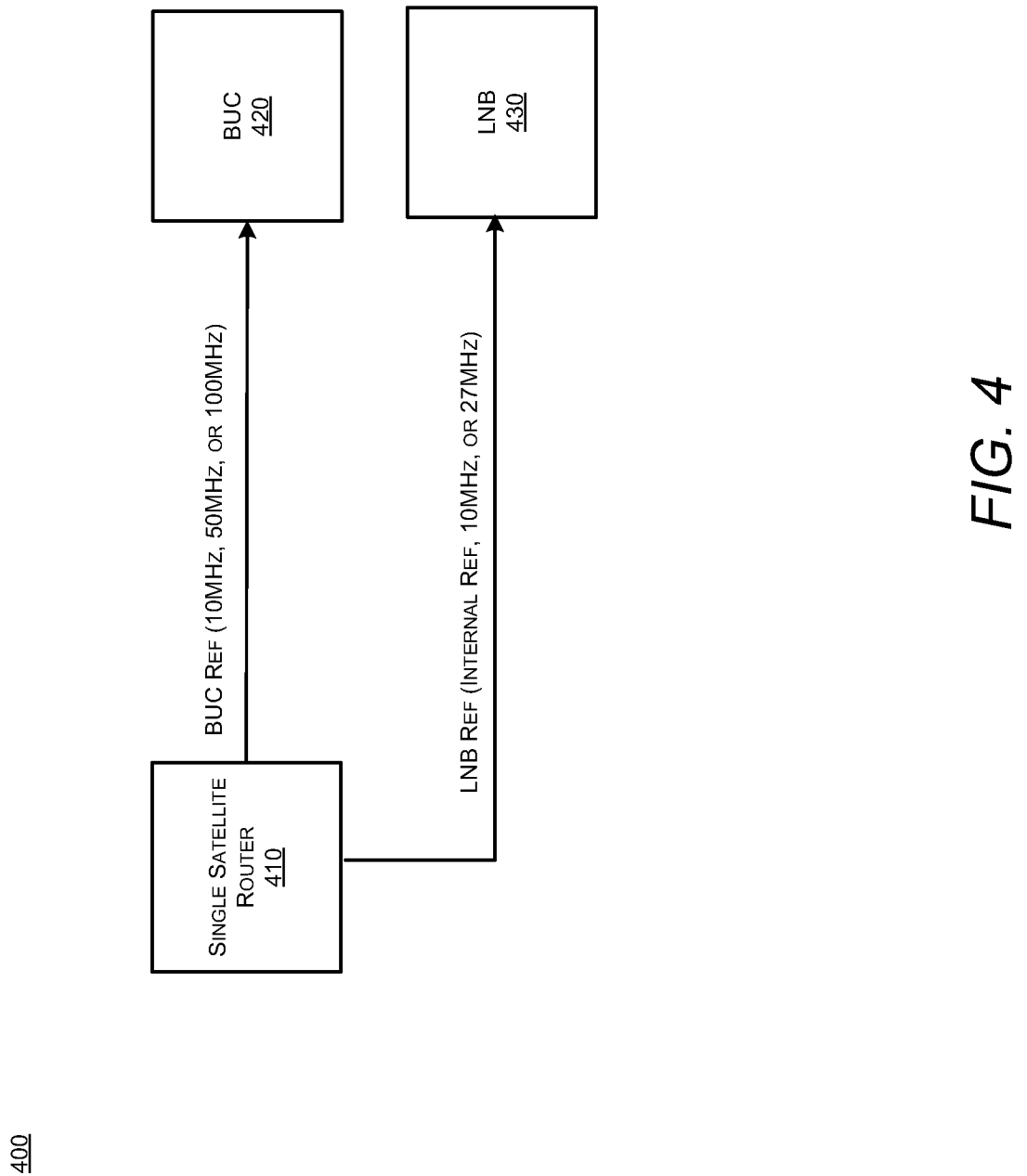
FIG. 4 illustrates a VSAT with a configurable network device to provide different reference frequencies to be used with different combinations of LNBs and BUCs, according to an example.

FIG. 4 illustrates a VSAT 400 with a configurable network device 410 to provide different reference frequencies to be used with different combinations of BUCs 420 and LNBs 430. In an example, a single network device 410 (or satellite modem or satellite router) described herein may be connected to one or more sets of BUCs 420 and LNBs 430. The network device 410 may receive information pertaining to a type of the ODU. Based on the type of the ODU associated with the VSAT 400, the network device 410 may be programmed/configured to generate configurable reference frequencies that may be used with different combinations of BUCs 420 and LNBs 430. In some examples, the network device 410 may be programmed/configured to generate configurable reference frequencies that may be used by a single set of BUC 420 and LNB 430 requiring different sets of reference frequency during the course of operation. In some examples, the plurality of configurable reference frequencies generated by the network device 410 may include radio transmitter (TX) and radio receiver (RX) reference frequencies that may be used by the VSAT 400. For example, the Tx reference frequencies may be for the BUCs 420, and the Rx reference frequencies may be for the LNBs 430 associated with the VSAT 400. In an example, the network device/satellite router 410 may generate Tx reference frequencies ranging from 10 MHz to 500 MHz for the BUC 420. At the same time, the network device may generate Rx reference frequencies ranging from 10 MHz to 100 MHz for the LNB 430. Further, the network device 410 also may generate Rx reference frequencies as an internal reference for the LNB 430.

In another example, a single network device 410 described herein may be connected to an electronic device or a communication device (not shown) that may operate at a given or variable reference frequency. The network device 410 may receive details pertaining to a type and requirement of the electronic device or communication device. Based on the type and requirement of the electronic device or communication device, the network device may be configured to generate the required reference frequencies that may be used by the electronic device or communication device. For example, the network device 410 described herein may have application in timing generators that are used in Gateway NOC's (network operating center) equipment.

Figure 5:
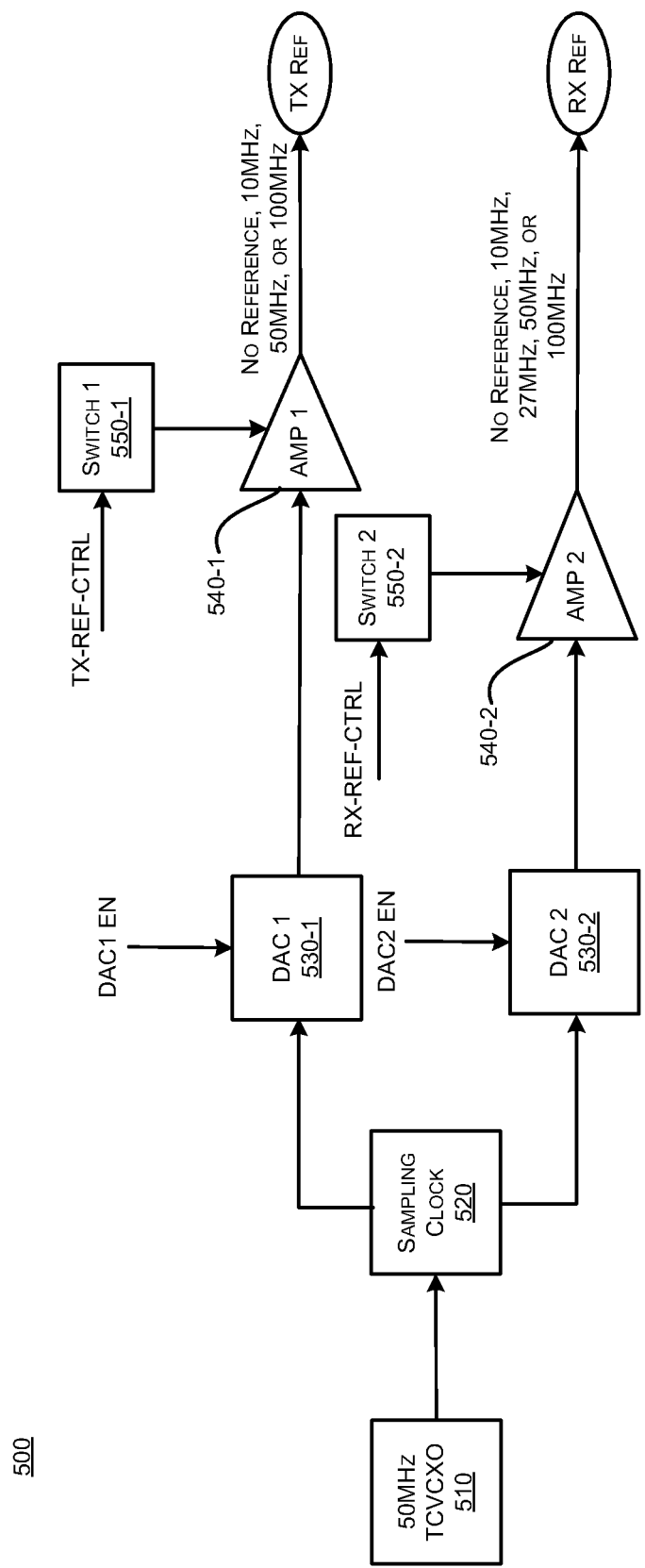
FIG. 5 illustrates a block diagram of a first embodiment of the network device for generating configurable radio transmitter (Tx) and radio receiver (Rx) reference frequencies, according to an example.

FIG. 5 illustrates a block diagram of a first embodiment of the network device 500 for generating configurable radio transmitter (Tx) and radio receiver (Rx) reference frequencies. In an example, the network device 500 described herein may include a single low noise oscillator 510 that may be operatively coupled with a sampling clock 520. The sampling clock 520 may be operatively one or more Digital-to-Analog converters (DACs) 530-1, 530-2 such that the sampling clock 520 upon actuation by the oscillator may generate and transmit a set of clock signals to the one or more DACs 530-1, 530-2, which results in the generation of a plurality of Tx reference frequencies and Rx reference frequencies by the one or more DACs 530-1, 530-2. Further, the output of each DAC 530-1, 530-2 may be amplified by an amplifier 540-1 540-2. For example, as depicted in FIG. 5, a first amplifier 540-1 may be connected to a first DAC 530-1, and a second amplifier 540-2 may be connected to a second DAC 540-2. The first amplifier 540-1 corresponding to the first DAC 530-1 may receive a Tx reference control frequency as an input through a first switch 550-1 to generate Tx reference frequencies. Further, the second amplifier 540-2 corresponding to the second DAC 530-2 may receive RX reference control frequency as an input through a second switch 550-2 to generate RX reference frequencies. For example, as shown in FIG. 5, the oscillator 510 may provide 50 MHz frequency, and the first amplifier 540-1 of the network device 500 may either generate no reference, or 10 MHz or 50 MHz or 100 MHz as Tx reference frequencies, and the second amplifier 540-2 of the network device 500 may either generate no reference or 10 MHz, 27 MHz, 50 MHz, or 100 MHz as Rx reference frequencies. The first amplifier 540-1 may either generate 10 MHz or 50 MHz or 100 MHz as Tx reference frequencies when the first switch 550-1 is activated (switched ON) upon receiving a reference switching signal. Further, the first amplifier 540-1 may generate no reference when the first switch 550-1 is de-activated (switched OFF). Similarly, the second amplifier 540-2 may either generate 10 MHz or 27 MHz or 50 MHz or 100 MHz as Rx reference frequencies when the second switch 550-2 is activated (switched ON) upon receiving a reference switching signal. Further, the second amplifier 540-2 may generate no reference when the second switch 550-2 is de-activated (switched OFF). Each of the DACs 530-1, 530-2 may enable the corresponding amplifiers 540-1, 540-2 to generate the Tx and Rx reference frequencies, upon receiving an enabled (EN) signal at EN pin of the DACs 530-1, 530-2. For example, the first DAC 530-1 may receive the DAC1 EN signal at EN pin, and the second DAC 530-2 may receive the DAC2 EN signal at EN pin.

It should be appreciated that at a time of installation, the ODU configuration (e.g., BUC and LNB) may be entered by an installer or technician. In this example, power may not be applied to the ODU until this is done. Once the modem software is informed of the ODU configuration, the overall circuitry may then be enabled to output the proper Tx and Rx reference frequencies for the LNBs/BUCs. Other various examples may also be provided.

Figure 6:
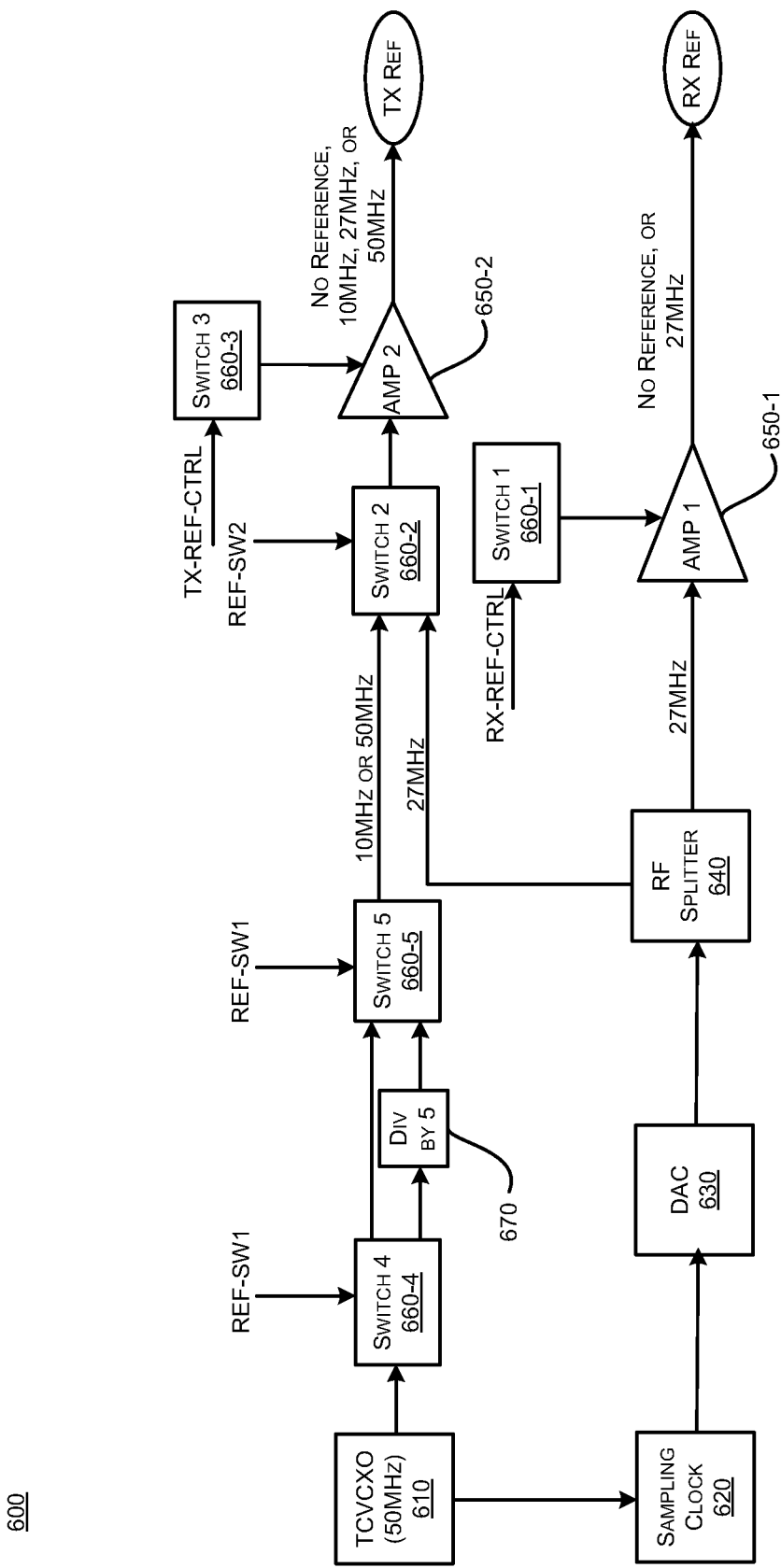
FIG. 6 illustrates a block diagram of a second embodiment of the network device for generating configurable radio transmitter (Tx) and radio receiver (Rx) reference frequencies, according to an example.

FIG. 6 illustrates a block diagram of a second embodiment of the network device 600 for generating configurable radio transmitter (Tx) and radio receiver (Rx) reference frequencies. In an example, the network device 600 described herein may include a single low noise oscillator 610 that may be operatively coupled with a sampling clock 620. The sampling clock 620 may then be operatively a single DAC 630 such that the sampling clock 620 upon actuation by the oscillator 610 may generate and transmit a clock signal to the DAC 630, which results in the generation of a reference frequency by the DAC 630. The DAC 630 may be operatively coupled with an RF splitter 640 such that one of the outputs of the RF splitter 640 may be processed by a first amplifier 650-1 to generate RX reference frequencies. The first amplifier 650-1 may receive an input from a first switch 660-1 that in turn may process the first amplifier 650-1 to provide the Rx reference control frequency. The network device 600 may further comprise a second switch 660-2 that may receive an input from the RF splitter 640 and may provide an output to a second amplifier 650-2 that may generate Tx reference frequencies. The second amplifier 650-2 may receive an input from a third switch 660-3 that in turn processes the second amplifier 650-2 to provide the TX reference control frequency. The second switch 660-2 may additionally receive one or more desired TX reference frequencies as input from a set of switches 660-4, 660-5 and a divider circuit 670, where the one or more desired TX reference frequencies are generated by division of an initial frequency input being generated by the oscillator 610. For example, as shown in FIG. 6, the oscillator may generate a 50 MHz frequency, which may be processed by the set of switches 660-4, 660-5, and divider circuit 670 to provide 10 MHz or 50 MHz frequency to the second switch 660-2. Further, one of the outputs of the RF splitter 640 may provide 27 MHz frequency to the first amplifier 650-1, which may correspondingly provide either no frequency or 27 MHz as Rx reference frequencies. The other output of the splitter 640 may provide 27 MHz frequency to the second switch 660-2. Based on the frequencies received by the second switch 660-2 from the RF splitter 640 and the set of switches 660-4, 660-5, and divider circuit 670, the second switch 660-2 may actuate the second amplifier 650-2 to correspondingly provide 10 MHz or 27 MHz or 50 MHz or no reference as Tx reference frequencies depending on the second switch 660-2 and the third switch 660-3. In some examples, the generated Tx reference frequencies may be for the BUCs and the generated Rx reference frequencies may be for the LNBs.

Those skilled in the art would appreciate that while various examples and figures of the devices, systems, and methods described herein have been elaborated and illustrated for a network device 500, 600 including one or two DACs and two amplifiers, which is providing only one set of two outputs from the network device 600, 500 for a set of BUC and LNB 420, 430, however, the network device 500, 600 may also involve more DACs and switches, but only one oscillator, to provide multiple sets of outputs for providing configurable Tx and Rx reference frequencies to multiple sets of BUCs and LNBs based on customer requirements, and all such examples are also within the scope of the devices, systems, and methods described herein.

In an example, at the time of installation of the network device 410, 500, 600 described herein, the ODU configuration (i.e. BUC and LNB Make and Model, or their reference frequency requirements) may be entered into the network device by an installer. Once the ODU configuration is installed in the network device, the network device (modem/router) may be operatively connected to the ODU and powered ON. The network device software may configure the network device to provide the required reference control signals to each switch associated with the network device and also provide the enable signals at the enable pins of each DACs of the network device, thereby controlling the overall circuitry of the network device to generate a specific set of Tx and Rx reference frequencies for the LNBs/BUCs.

Figure 7:
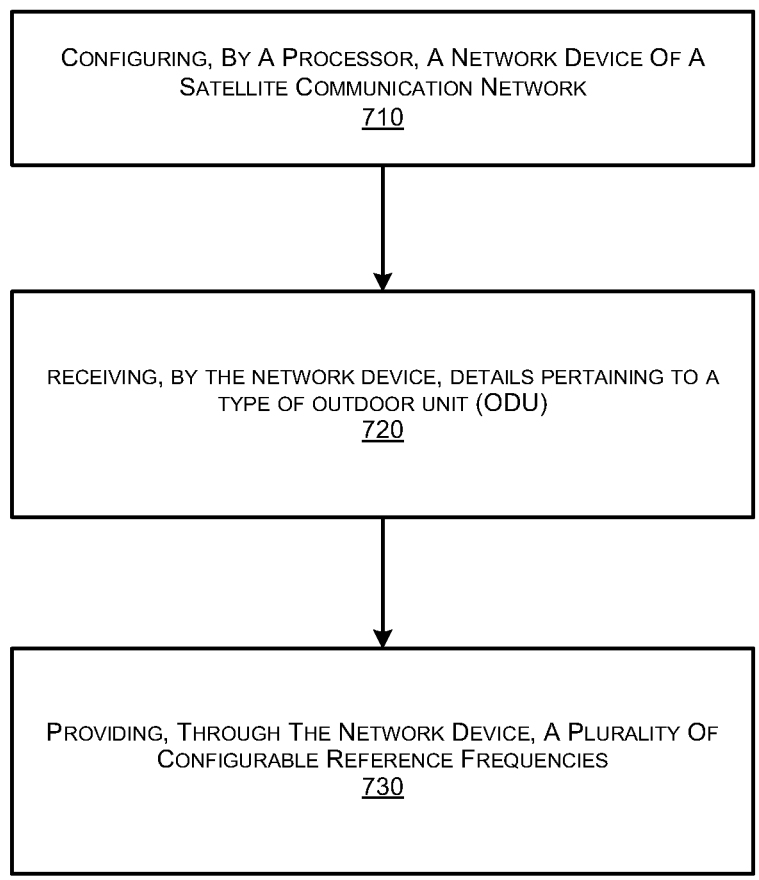
FIG. 7 illustrates a flow diagram of a method for providing/generating configurable Tx and Rx reference frequencies, according to an example.

FIG. 7 illustrates a method 700 for providing configurable reference frequencies to be used with different combinations of low noise block converters (LNBs) and block-up converters (BUCs) in a satellite communication network, according to an example. The method 700 is provided by way of example, as there may be a variety of ways to carry out the method described herein. Although the method 700 is primarily described as being performed by the terminals/VSAT 400 or network devices 500, 600 of FIGS. 4 to 6, the method 700 may be executed or otherwise performed by one or more processing components of another system or a combination of systems. Each block shown in FIG. 7 may further represent one or more processes, methods, or subroutines, and one or more of the blocks may include machine-readable instructions stored on a non-transitory computer-readable medium and executed by a processor or other type of processing circuit to perform one or more operations described herein. The VSAT/terminals, for example, may provide or generate configurable reference based on the type of outdoor unit (ODU) of the VSAT/terminal such that the plurality of configurable reference frequencies may be used with different combinations of LNBs and BUCs associated with an indoor unit (IDU) of the VSAT/terminal. In some examples, this may be an automated sequence of actions, as described below and shown in FIG. 7.

At 710, a network device associated with the terminal or the satellite communication network may be configured by a processor in communication with the network device or VSATs. For example, the processor may be programmed as per customers' requirements or based on the type of outdoor unit (ODU) associated with the VSAT/terminal. This may correspondingly configure the network device to provide/generate configurable reference frequencies of predefined values as configured through the processor. At 720, the network device may receive information pertaining to a type and requirement of the ODU. The network device may also determine the type of ODU based on the received information. In an example, details/information about the ODU may be retrieved by communicating with the ODU via a protocol such as 2-way DiSEqC, assuming the ODU does not first need a clock source from the modem/router. The make and model of the ODU (or the reference frequency requirement of the BUC and LNB) may be entered by the customer/installer at install time and network device (modem/router) software may configure the network device to provide the reference frequencies accordingly. Further, at 730, the network device may provide a plurality of configurable reference frequencies to IDU of the terminal or to other telecommunication networks or systems as required. For example, a plurality of configurable reference frequencies based on the type of ODU such that the configurable reference frequencies may be used with different combinations of LNBs and BUCs associated with IDU of the terminal/VSAT, without changing the network device. In some examples, the plurality of configurable reference frequencies generated at block 420 may comprise radio transmitter (TX) and radio receiver (RX) reference frequencies.

Figure 8:
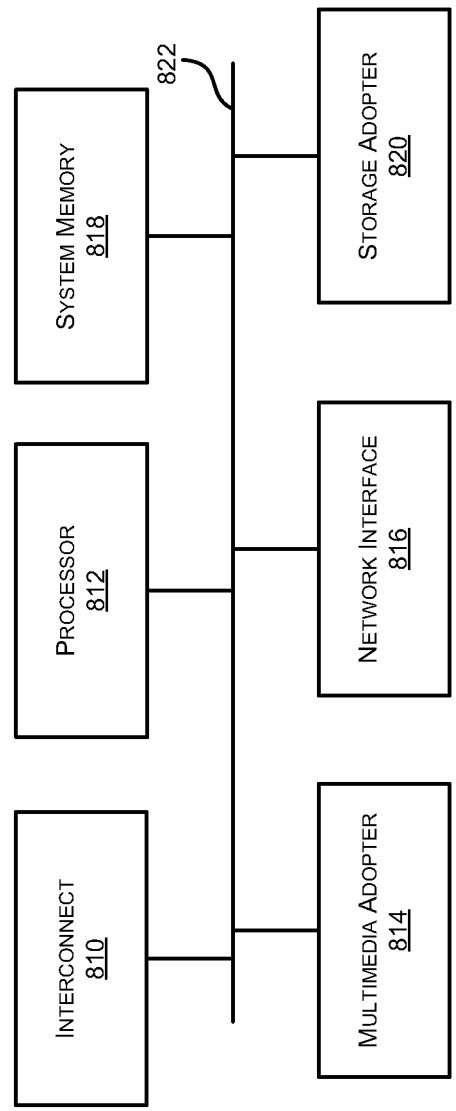
FIG. 8 illustrates a block diagram of a computer system for monitoring operational status and detecting faults, according to an example.

FIG. 8 illustrates a block diagram of a computer system for providing configurable reference frequencies, according to an example. The computer system 800 may be part of or any one of the terminals 110, the gateway 130, the network data center 140, the network management system (NMS) 150, the business system 160, as shown in system 100 and/or 300 to perform the functions and features described herein. The computer system 800 may include, among other things, an interconnect 810, a processor 812, a multimedia adapter 814, a network interface 816, a system memory 818, and a storage adapter 820.

The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 810 may allow data communication between the processor 812 and system memory 818, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may be the central processing unit (CPU) of the computing device and may control overall operation of the computing device. In some examples, the processor 812 may accomplish this by executing software or firmware stored in system memory 818 or other data via the storage adapter 820. The processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 816 may provide the computing device with an ability to communicate with a variety of remove devices over a network (e.g., private network 170 or public network 180 of FIG. 1) and may include, for example, an Ethernet adapter, a Fiber Channel adapter, and/or other wired- or wireless-enabled adapter. The network interface 816 may provide a direct or indirect connection from one network element to another, and facilitate communication and between various network elements.

The storage adapter 820 may connect to a standard computer-readable medium for storage and/or retrieval of information, such as a fixed disk drive (internal or external).

Many other devices, components, elements, or subsystems (not shown) may be connected in a similar manner to the interconnect 810 or via a network (e.g., private network 170 or public network 180 of FIG. 1). Conversely, all of the devices shown in FIG. 8 need not be present to practice the disclosed systems and methods. The devices and subsystems can be interconnected in different ways from that shown in FIG. 8. Code or computer-readable instructions to implement the dynamic approaches for payment gateway selection and payment transaction processing of the disclosed systems and methods may be stored in computer-readable storage media such as one or more of system memory 818 or other storage. Code or computer-readable instructions to implement the dynamic approaches for payment gateway selection and payment transaction processing of the disclosed systems and methods may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for monitoring system health and/or detecting faults.

It should be appreciated that the devices, systems and methods described herein may facilitate more reliable use of terminals to monitor system health and/or detect system faults. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the devices, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to network devices, satellite modems, and methods, for providing configurable reference frequencies to be used with different combinations of low noise block converters (LNBs) and block-up converters (BUCs), it should be appreciated that the devices, systems and methods described herein may also be used for providing reference frequencies or signals having specific frequency in various other systems and other implementations. In fact, there may be numerous applications in cable or optical communication networks including fiber sensor systems that could employ the systems and methods as well. For example, the network device herein may be used in timing generators in Gateway NOC's (network operating center) equipment.

It should be appreciated that the devices, systems, and methods described herein may also be used to operate multiple electronic and telecommunication devices or circuitries together, using a single flexible and customizable terminal/network device, without changing the hardware or design of the network device/terminals.

By leveraging existing customer terminals/VSATs/network devices, the devices, system and methods described herein may provide efficient reference frequency generation techniques and a cost-effective approach that may be readily integrated into various and existing network equipment. The devices, systems and methods described herein may provide mechanical simplicity and adaptability to small or large satellite communication systems. Ultimately, the devices, systems and methods described herein may increase efficiency, reduce cost, maximize existing equipment, minimize adverse effects, drawbacks, and limitations of traditional VSATs and terminal devices, and improve the reference frequency generation capability and flexibility.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A network device for a satellite communication network, comprising:
   a processor; and
   a memory having instructions, which when executed by the processor, causes the processor to:
      receive information pertaining to a type of an outdoor unit (ODU);
      determine a type of ODU based on the received information; and
      provide a plurality of configurable reference frequencies based on the type of the ODU such that the plurality of configurable reference frequencies are used with one or more combinations of low noise block converters (LNBs) and block-up converters (BUCs) associated with the ODU.

2. The network device as claimed in claim 1, wherein the network device is any of a satellite modem, satellite transceiver, or a satellite router.

3. The network device as claimed in claim 1, wherein the plurality of configurable reference frequencies comprises radio transmitter (TX) and radio receiver (RX) reference frequencies.

4. The network device as claimed in claim 3, wherein the network device comprises:
   a low noise oscillator that is operatively coupled with a sampling clock such that the sampling clock causes one or more Digital-to-Analog converters (DACs) to generate the plurality of TX reference frequencies for the BUCs and RX reference frequencies for the LNBs.

5. The network device as claimed in claim 4, wherein output of the plurality of DACs are amplified by corresponding amplifiers, wherein a first amplifier corresponding to a first DAC receives, as input, TX reference control frequency through a first switch to generate TX reference frequencies, and a second amplifier corresponding to a second DAC receives, as input, RX reference control frequency through a second switch to generate RX reference frequencies.

6. The network device as claimed in claim 1, wherein the network device comprises:
   a DAC that is operatively coupled with a RF splitter such that output of the RF splitter is processed by a first amplifier to generate RX reference frequencies, wherein the first amplifier receives an input from a first switch that in turn processes a RX reference control frequency.

7. The network device as claimed in claim 5, wherein the network device further comprises a second switch that receives the input from the RF splitter and provides output to a second amplifier that generates TX reference frequencies, wherein the second amplifier receives an input from a third switch that in turn processes a TX reference control frequency.

8. The network device as claimed in claim 6, wherein the second switch additionally receives one or more desired TX reference frequencies as input from a fourth switch, wherein the one or more desired TX reference frequencies are generated by division of an initial frequency input generated by an oscillator.

9. A satellite modem configured in a satellite communication network, wherein the satellite modem receives details pertaining to a type of an outdoor unit (ODU), and correspondingly provides a plurality of configurable reference frequencies based on the type of the ODU such that the plurality of configurable reference frequencies are used with different combinations of low noise block converters (LNBs) on receiver (RX) side and block-up converters (BUCs) on transmitter (TX) side.

10. The satellite modem as claimed in claim 9, wherein the satellite modem comprises a low noise oscillator that is operatively coupled with a sampling clock that provides a clock signal to one or more Digital-to-Analog converters (DACs) so as to generate the plurality of TX reference frequencies for the BUCs and RX reference frequencies for the LNBs.

11. A method for providing a plurality of configurable reference frequencies, comprising:

configuring, by a processor, a network device of a satellite communication network;

receiving, by the network device, information pertaining to a type of Outdoor Unit (ODU);

determining, by the network device, the type of ODU based on the based on the received information; and providing, through the network device, a plurality of configurable reference frequencies based on the type of the ODU such that the plurality of configurable reference frequencies are used with different combinations of low noise block converters (LNBs) and block-up converters (BUCs).

12. The method as claimed in claim 11, wherein the network device is any of a satellite modem, satellite transceiver, or a satellite router.

13. The method as claimed in claim 11, wherein the plurality of configurable reference frequencies comprises radio transmitter (TX) and radio receiver (RX) reference frequencies.

14. The method as claimed in claim 13, wherein the network device comprises:

a low noise oscillator that is operatively coupled with a sampling clock such that the sampling clock causes one or more Digital-to-Analog converters (DACs) to generate the plurality of TX reference frequencies for the BUCs and RX reference frequencies for the LNBs.

15. The method as claimed in claim 14, wherein output of the plurality of DACs is amplified by corresponding amplifiers, wherein a first amplifier corresponding to a first DAC receives, as input, TX reference control frequency through a first switch to generate TX reference frequencies, and a second amplifier corresponding to a second DAC receives, as input, RX reference control frequency through a second switch to generate RX reference frequencies.

16. The method as claimed in claim 13, wherein the network device comprises:

a DAC that is operatively coupled with a RF splitter such that output of the RF splitter is processed by a first amplifier to generate RX reference frequencies, wherein the first amplifier receives an input from a first switch that in turn processes a RX reference control frequency.

17. The method as claimed in claim 16, wherein the network device further comprises a second switch that receives the input from the RF splitter and provides output to a second amplifier that generates TX reference frequencies, wherein the second amplifier receives an input from a third switch that in turn processes a TX reference control frequency.

18. The method as claimed in claim 17, wherein the second switch additionally receives one or more desired TX reference frequencies as input from a fourth switch, wherein the one or more desired TX reference frequencies are generated by division of an initial frequency input generated by an oscillator.

19. A non-transitory computer-readable storage medium having an executable stored thereon, which when executed instructs a processor to perform a method as follows:

configuring a network device of a satellite communication network;

receiving information pertaining to a type of Outdoor Unit (ODU);

determining the type of ODU based on the received information; and providing, through the network device, a plurality of configurable reference frequencies based on the type of the ODU such that the plurality of configurable reference frequencies are used with different combinations of low noise block converters (LNBs) and block-up converters (BUCs).

20. The non-transitory computer-readable storage medium as claimed in claim 19, wherein the network device is any of a satellite modem, satellite transceiver, or a satellite router.

* * * * *